US000001529H

United States Statutory Invention Registration [19]

[11] Reg. Number: H1529

[45] Published: May 7, 1996

Schneider, Jr. et al.

[54] METHOD FOR WAVE EQUATION VELOCITY REPLACEMENT OF THE LOW-VELOCITY-LAYER IN SEISMIC DATA PROCESSING

[75] Inventors: William A. Schneider, Jr.; Mark S. Ephron, both of Houston, Tex.

[73] Assignee: Exxon Production Research Company, Houston, Tex.

[21] Appl. No.: 134,808

[22] Filed: Oct. 12, 1993

[51] Int. Cl.[6] ..... G01V 1/28

[52] U.S. Cl. ..... 367/54; 367/36; 364/421

[58] Field of Search ..... 367/36, 54; 364/421

[56] References Cited

U.S. PATENT DOCUMENTS

| | | | |
|---|---|---|---|
| 2,596,463 | 5/1952 | Barthelmes | 181/0.5 |
| 2,990,535 | 6/1961 | Parkinson et al. | 340/15 |
| 3,284,765 | 11/1966 | Bratton et al. | 340/15.5 |
| 3,539,982 | 11/1970 | Hileman et al. | 340/15.5 |
| 4,298,966 | 11/1981 | Ruehle | 367/50 |
| 4,498,157 | 2/1985 | Martin et al. | 367/50 |
| 4,571,710 | 2/1986 | Neidell et al. | 367/38 |
| 4,695,984 | 9/1987 | Paal | 367/54 |
| 4,887,244 | 12/1989 | Willis et al. | 367/73 |
| 4,943,950 | 7/1990 | Beasley et al. | 367/50 |
| 4,964,089 | 10/1990 | Wang et al. | 367/73 |
| 4,992,993 | 2/1991 | Chambers | 364/421 |
| 5,073,876 | 12/1991 | Propes | 367/54 |

FOREIGN PATENT DOCUMENTS 62293 1/1995 European Pat. Off. .

OTHER PUBLICATIONS

Schneider et al, Geophysics, vol. 60, #2, pp. 573–579, Apr. 1995. Abst. only herewith.

Beresford et al, 9th Aseg et al Geophys. Conf., Oct. 5, 1992, Explor. Geophys., vol. 23, #1–2, pp. 23–26 Jun. 1992; abst. only herewith.

Berkhout, A. M.; *Seismic Migration. Imaging of Acoustic Energy by Wave Field Extrapolation.; A. Theoretical Aspects;* 2nd ed.; Elsevier Scientific Publishing Co.; 1982.

Berryhill, J. R.; *Wave Equation Datuming;* Geophysics, vol. 44, pp. 1329–1344; 1979.

Berryhill, J. R.; *Wave Equation Datuming Before Stack;* Geophysics, vol. 49, pp. 2064–2066; 1984.

Berryhill, J. R.; *Submarine Canyons: Velocity Replacement by Wave Equation Datuming Before Stack;* Geophysics, vol. 51, pp. 1572–1579; 1986.

Faye, J. P., et al; *Wave Equation Datuming for Land Prestack Migration;* 57th Annual International Mtg., Society of Exploration Geophysicists; 1987.

Hagedoorn, J. G.; *The Plus–Minus Method of Interpreting Seismic Refraction Sections; Geophysical Prospecting, vol. 7, pp. 158–182; 1959.*

Malloy, J. E., et al; *Prestack Wave–Equation Processing of a Complex Synthetic Line;* 60th Annual Intntl. Mtg., Soc. Expl. Geophysicists, 1990.

(List continued on next page.)

*Primary Examiner*—Bernarr E. Gregory

[57] ABSTRACT

A method for correcting seismic data for the effects of the low-velocity-layer. According to the method, estimates of the seismic velocity in the low-velocity-layer and the depth of the low-velocity-layer are used to extrapolate the seismic data to simulated source and receiver positions located at the base of the low-velocity-layer. The data are then extrapolated to an arbitrary reference datum using a selected replacement velocity. The principles of wave equation datuming are used for these extrapolations.

11 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

Palmer, D., *An Introduction to the Generalized Reciprocal Method of Seismic Refraction Interpretation;* Geophysics, vol. 46, pp. 1508–1518; 1981.

Schneider, W. A.; *Integral Formulation for Migration in Two and Three Dimensions;* Geophysics, vol. 43, pp. 49–76; 1978.

Shtivelman, V, et al; *Datum Correction by Wave–Equation Extrapolation;* Geophysics, vol. 53, pp. 1311–1322; 1988.

Wenzel, F.; *Processing of Wide–Angle Vibroseis Data;* Geophysics, vol. 53, pp. 1303–1310; 1988.

Wiggins, J. W.; *Kirchhoff Integral Extrapolation and Migration of Nonplanar Data;* Geophysics, vol. 49, pp. 1239–1248; 1984.

Yilmaz, O.; *Seismic Data Processing;* Society of Exploration Geophysicists, pp. 324 and 327; 1987.

Yilmaz, O., et al; *Prestack Layer Replacement;* Geophysics, vol. 51, pp. 1355–1369.

METHOD FOR WAVE EQUATION VELOCITY REPLACEMENT OF THE LOW-VELOCITY-LAYER IN SEISMIC DATA PROCESSING

FIELD OF THE INVENTION

The present invention relates to the field of seismic data processing and, more particularly, to a method for correcting seismic data for the effects of the low-velocity-layer.

BACKGROUND OF THE INVENTION

Seismic exploration is one of the most powerful techniques for investigating the configuration of the subterranean formations beneath the earth's surface. The typical end product of a seismic survey is a map, termed a "seismic depth section," indicating the thickness and orientation of the various strata underlying that portion of the earth's surface from which the survey was conducted. By correlating the seismic depth section with other geologic information, such as data concerning surface outcroppings of various strata, wellbore cuttings and logs, and previous seismic sections, detailed information concerning the outermost several kilometers of the earth's crust can be developed. The predominant use of seismic exploration is in the search for subsurface structures favorable to the existence of oil and gas reservoirs.

Seismic reflection surveys, the most common type of seismic survey, are performed by initiating a shock wave at the earth's surface and monitoring at a plurality of surface locations the reflections of this disturbance from the underlying subterranean formations. These reflections occur from regions where there is a change in the reflectivity of the earth, generally the interfaces between adjacent strata. The devices used to monitor the reflections are termed geophones. The signal recorded by each geophone represents, as a function of time, the amplitude of the reflections detected by that geophona. This signal is commonly referred to as a "trace". The lateral distance along the earth's surface between the seismic source and a particular geophone is known as the "offset" of that geophone.

In performing a seismic survey, a large number of geophones, as many as one thousand or even more, are positioned along the line of the survey. Accordingly, for each shot numerous traces are obtained. At the time each trace is recorded, it is uniquely designated on the basis of source and detector position. In this manner, every trace is uniquely identified relative to all other traces. This information is later utilized in processing and displaying the traces.

The traces obtained in performing the survey must be processed prior to final display and analysis to compensate for various factors which impede utilization of the original traces. One of the most troublesome of the processing steps involves compensating for the nonhyperbolic distortion of the traces caused by the uppermost layer of the earth, typically 10–100 meters thick, termed the "low-velocity-layer" or "weathered layer" (hereinafter, the "LVL"). The velocity of seismic compressional waves (p-waves) through the LVL is typically in the range of 500–1000 meters per second, while p-wave velocities in the strata below the LVL are typically in excess of 1500 meters per second. The velocity of seismic shear waves (s-waves) is also less in the LVL than it is in the strata below the LVL. Because the LVL often varies greatly in thickness over relatively short horizontal distances, the transit time of a seismic wave through the LVL can vary significantly over the line of a seismic survey. If not corrected for, this variation can significantly hamper subsequent data processing and interpretation and can result in erroneous calculations of the configuration and depth of the underlying strata. Because even small variations in the calculated orientation of rock strata can have a major impact on decisions regarding the probability of oil and gas being found at a certain subterranean location, it is important that aberrations caused by the LVL be removed with the greatest precision possible.

Conventional seismic data processing uses refraction statics to compensate for the effects of the LVL. In refraction statics, traveltime corrections are determined from first arrivals on offset data traces. These traveltime corrections are then applied to the data to approximate the reflection arrival times which would have been observed if all measurements had been made on a flat datum plane with no LVL present.

As will be well known to those skilled in the art, first arrival refraction analysis may be used to estimate refractor velocity (i.e., the seismic velocity in the stratigraphic layer immediately below the base of the LVL) and LVL thickness, if the seismic velocity in the LVL ("LVL velocity") is inferred. Refraction data alone are insufficient to uniquely determine the refractor velocity, LVL velocity, and LVL thickness. Various well-known methods exist for estimating the LVL velocity, including the use of check shot surveys and/or well logs, standard velocity analysis of small offset reflections, and interpretation of all available geologic data. In some cases, it may be possible to estimate the LVL velocity as some function of the refractor velocity.

Once the LVL velocity and depth have been estimated, approximate vertical propagation traveltimes through the LVL are calculated. Each seismic data trace is then time advanced by this amount, simulating the effect of having sources and receivers located at the base of the LVL. Then, appropriate vertical time shifts may be computed, using a "replacement" velocity, which will redatum the sources and receivers to a horizontal datum. Each trace is time delayed by this amount. The replacement velocity is usually chosen to be the refractor velocity so as to make the near-surface region appear homogeneous. In many situations, this methodology yields acceptable results; however, seismic velocity replacement with static shifts assumes that only vertical wave propagation occurred through the LVL and that no ray-bending occurred at the LVL base. These assumptions are usually inadequate in the presence of complicated, near-surface geology, such as may be found in fold and thrust belt regions, because of the severe raypath bending that occurs at the LVL base and the unusually thick LVLs present. In these areas, refraction statics do not adequately compensate for the nonhyperbolic data distortion caused by the LVL.

It would be desirable to provide a method for removing the LVL-induced nonhyperbolic distortion of land seismic data which overcomes the above-identified problems of the traditional refraction statics approach. The present invention provides such a method.

SUMMARY OF THE INVENTION

The present invention is a method for correcting seismic data for the effects of the LVL. The method is based on the principles of wave equation datuming. In a preferred embodiment, the inventive method comprises the steps of obtaining estimates of the seismic velocity in the LVL and the depth of the LVL, using these estimates to extrapolate the seismic data to simulated source and receiver positions at the base of the LVL, and then extrapolating the data from the simulated positions at the base of the LVL to positions on a selected reference datum using a replacement velocity. Preferably, the replacement velocity is the refractor velocity.

Assuming the estimates of seismic velocity in the LVL and the depth of the LVL are reasonably accurate, the present invention should remove substantially all LVL-induced nonhyperbolic distortion from the data. A preferred method for obtaining these estimates involves using first arrival analysis of at least three sets of common offset traces to determine the traveltime from the source to the base of the LVL and the traveltime from the base of the LVL to the receiver, as more fully described in U.S. Pat. No. 4,695,984 by E. F. Paal. Any of a number of other well-known methods may be used to obtain these estimates.

BRIEF DESCRIPTION OF THE DRAWINGS

The present invention and its advantages will be better understood by referring to the following detailed description and the attached drawings in which.

Figure 1:
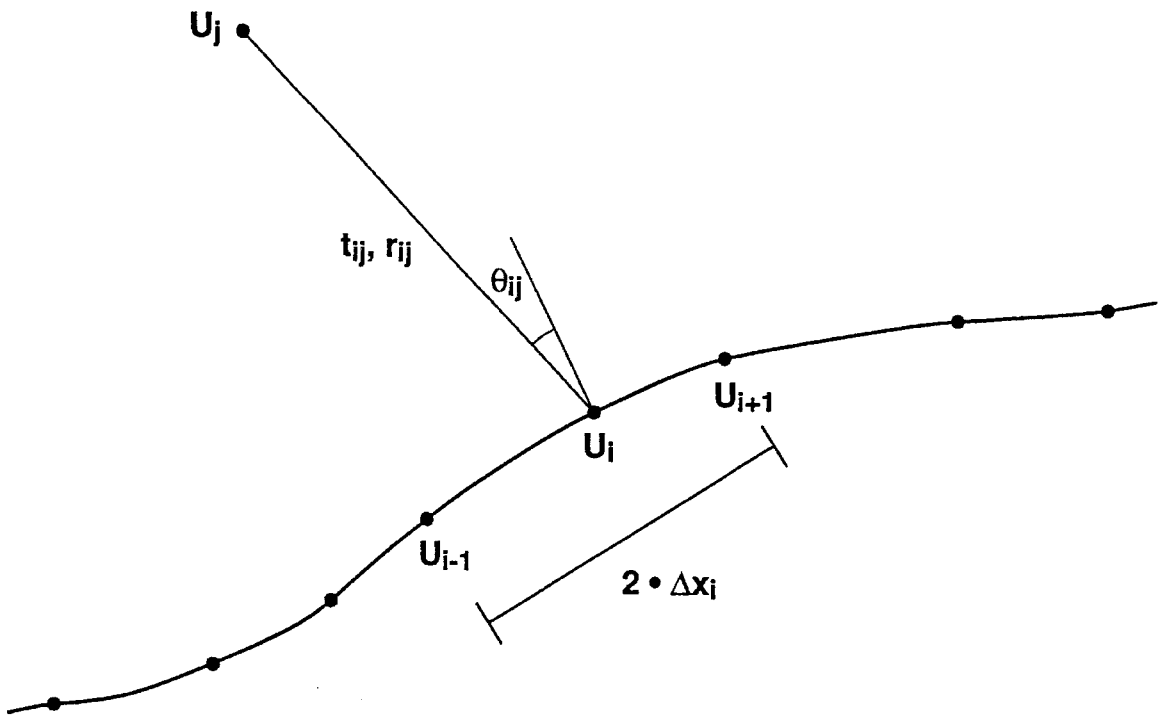
FIG. 1 illustrates the geometry and terms applicable to wave equation datuming.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is useful in accurate imaging of the subsurface when seismic data have been recorded on an irregular topographic surface with a variable LVL. In general, estimates of the velocity of seismic waves (compressional waves or shear waves, as the case may be) in the LVL and the depth of the LVL are obtained through first arrival refraction analysis and other means, as described above. Wave equation datuming is then used to extrapolate the data gathered along the surface of the earth to approximate data that would have been gathered if the sources and receivers had been located at the base of the LVL. The wave equation is then used to extrapolate a second time from the base of the LVL to a new datum, which is normally horizontal. In this second wave equation extrapolation, a replacement velocity close to the seismic velocity in the formation immediately below the LVL is preferably used so that the near-surface region appears homogeneous in the resulting seismic sections. As a result of this process, nonhyperbolic distortions of the seismic data resulting from the irregular surface topography and the variable LVL are removed. Various modifications and extensions of the present invention will be apparent to those skilled in the art based on the teachings set forth herein. To the extent that the following description is specific to a particular embodiment of the invention, this is intended to be illustrative and is not to be considered as unduly limiting the scope of the invention.

Wave Equation Datuming

The present invention utilizes the principles of wave equation datuming. Wave equation datuming is a means of extrapolating a recorded seismic data wavefield from one reference surface to another. Numerically, it moves all source and receiver locations from the current reference surface (such as the surface of the earth) where the data were recorded, to some other reference surface, such as a horizontal datum. It simulates the data that would have been recorded had the seismic sources and receivers actually been distributed on the new reference surface. Berryhill, J. R., "Wave equation datuming," *Geophysics,* volume 44, pp. 1329–1344 (1979), derived the original wave equation datuming formulation for zero-offset data, from the Kirchhoff integral solution of the acoustic wave equation, and subsequently extended wave equation datuming to prestack seismic data in Berryhill, J. R., "Wave equation datuming before stack," *Geophysics,* 49, pp. 2064–2066 (1984).

Wave equation datuming has proven successful in removing the nonhyperbolic distortion induced by an irregular water layer on seismic data recorded over rough water-bottom topography. Berryhill, J. R., "Submarine canyons: Velocity replacement by wave equation datuming before stack," *Geophysics,* volume 51, pp. 1572–1579 (1986); Yilmaz, O. and Lucas, D., "Prestack layer replacement," *Geophysics,* volume 51, pp. 1355–1369 (1986). Implementation consisted of extrapolating the data from the surface to the water-bottom, with the water velocity, then extrapolating back up to the surface, with the (replacement) velocity of the shallow sedimentary layers. The impetus behind performing such processing was the superior subsequent data processing and interpretation that would then be realizable.

However, application of wave equation datuming to land seismic data is much more difficult. This is because unfortunate common characteristics of land data, including crooked line geometry, coarse source spacings, missing data and large amplitude noise levels may render land data inappropriate for prestack wave equation datuming.

Land data applications of wave equation datuming are virtually undocumented, with the exception of Shtivelman, V. and Canning, A., "Datum correction by wave equation extrapolation," *Geophysics,* volume 53, pp. 1311–1322 (1988); and Malloy, J. E., Ho, R. K., Gill, J. A., and Shirley, T. E., "Prestack Wave equation Processing of a Complex Synthetic Line," Presented at the 60th Ann. Intern. Mtg., Soc. Expl. Geophys. (1990). In Shtivelman and Canning, the wave equation datuming was applied to real data, performing datum corrections only, not LVL velocity replacement. In Malloy et al., a synthetic experiment was performed, again evaluating datum corrections only, with wave equation datuming. In a related application, Wenzel, F., "Processing of wide-angle Vibroseis data," *Geophysics,* volume 53, pp. 1303–1310 (1988) performed weathering corrections on wide-angle vibroseis data using a wave theoretical approach in the slant-stack domain.

U.S. Pat. No. 4,887,244 by M. E. Willis et al. discloses the use of wave equation datuming to interpolate additional traces between existing traces in order to compensate for unsatisfactory or missing data. This method may be applied to either land or marine seismic data.

We have found that wave equation datuming may be used to correct for LVL-induced nonhyperbolic distribution of land seismic data, especially modern vintage data because of improved acquisition quality standards and methodology.

The Invention

According to the present invention, the effects of the LVL are removed by extrapolating (moving numerically) all sources and receivers from the actual recording surface to the base of the LVL, using the LVL velocity, and then extrapolating all sources and receivers generally upward to a horizontal interpretation datum elevation, using a replacement velocity, rather than the LVL velocity. Preferably, the replacement velocity is the seismic velocity in the subsurface formation immediately below the LVL (i.e., the refractor velocity); however, other replacement velocities may be used if desired. If the LVL model is accurate and the seismic line is reasonably appropriate for wave equation datuming, then the present invention will remove all LVL-induced nonhyperbolic distortion from the data. Subsequent velocity analyses, which are highly sensitive to nonhyperbolic distortion, will then be easier and more accurate, leading to a more interpretable result.

Berryhill (1979) derived the discrete Kirchhoff extrapolation formula $$U_j(t)=\frac{1}{\pi}\sum_i \Delta x_i \cos\theta_{ij}\frac{t_{ij}}{r_{ij}}\ U_i(t-t_{ij})*F_{ij}$$

to compute the wavefield at one place on the new reference surface, $U_j$, by summing over the wavefield at all positions on the current reference surface, $U_i$. FIG. 1 illustrates the geometry. $\Delta x_i$ is the local trace spacing on the current reference surface at position i. In FIG. 1, the distance from position i−1 to position i+1 is designated as $2\Delta x_i$. Therefore, $\Delta x_i$ is the distance from the midpoint between positions i−1 and i to the midpoint between positions i and i+1. The delay time or traveltime from position i on the current surface to position j on the new surface is denoted $t_{ij}$; $r_{ij}$ is the distance between positions i and j; and $\theta_{ij}$ is the angle that the normal to the current surface at position i makes with a vector connecting positions i and j. The delay time, $t_{ij}$, is equal to the distance, $r_{ij}$, divided by the average seismic velocity between position i and position j, $V_{ij}$. The "obliquity" factor is given by cos $\theta_{ij}$ and is discussed in Schneider, W. A., "Integral Formulation for Migration in Two and Three Dimensions," *Geophysics,* volume 43, pp. 49–76 and Wiggins, J. W., "Kirchhoff integral extrapolation and migration of nonplanar data," *Geophysics,* volume 49, pp. 1239–1248. $F_{ij}$ is the variable "wave-shaping filter," of length 5–10 samples, which is convolved with each trace during the summation, as is well known by those of ordinary skill in the art. This wave-shaping filter is described in detail in Berryhill (1979) and, accordingly, will not be further described herein.

Berryhill (1984) indicated that prestack wave equation datuming is a two-step process. The above formula is first applied independently to each common-source gather, whereby all receivers are extrapolated from the common reference surface to the new reference surface. Then, the data are sorted to common-receiver order, reciprocity is invoked, and the formula is independently applied to each common-receiver gather, whereby all sources are extrapolated from the current reference surface to the new one. For present purposes, reciprocity provides that if the source and receiver have identical directional characteristics and there are no mode conversions, then interchanging the positions of source and receiver yields the identical trace.

The extrapolation formula presented above operates in the space-time domain. One may also use the equivalent space-frequency domain formula of Berkhout, A. J., *Seismic Migration,* "Imaging of Acoustic Energy by Wave Field Extrapolation; A. Theoretical Aspects," 2nd ed., Elsevier, Scientific Pub. Co. (1982), p. 126. The wave number-frequency domain could also be used in connection with the present invention.

Faye, J. P., Thomson, C. S. F. and Jeannot, J. P., "Wave Field Datuming for Land Prestack Migration," Presented at the 57th Ann. Intern. Mtg., Soc. Explor. Geophys. (1987) introduced an alternate wave equation datuming formulation which is based upon a finite-difference solution of the acoustic wave equation. This approach offers the advantage that it may be conveniently incorporated into a companion finite-difference prestack migration algorithm. However, preferably the Kirchhoff integral formulation is used because of its robust character in handling typical land data, which have nonuniform acquisition characteristics.

In practicing the present invention, the recorded data are first analyzed for first arrival refraction information to give estimates of the refractor velocity and the thickness of the LVL. Then, an estimate of the LVL velocity is obtained through any of the well-known methods discussed above.

Next, the receivers are reconfigured using the following steps:

1. Gather data from the first source location recorded by all receivers.
2. Determine traveltimes from each of the original receiver positions to each of the simulated receiver positions. The LVL velocity is used and the simulated receiver positions are located vertically below the original receiver positions at the base of the LVL.
3. The data are then extrapolated to the simulated receiver positions using the extrapolation formula set forth above.
4. Repeat steps 1 through 3 for all source locations.

Next, the sources are reconfigured using the following steps:

1. Gather data from all sources recorded by the first receiver.
2. Determine traveltimes from each of the original source positions to each of the simulated source positions. The LVL velocity is used and the simulated source positions are located vertically below the original source positions at the base of the LVL.
3. The data are then extrapolated to the simulated source positions using the extrapolation formula set forth above.
4. Repeat steps 1 through 3 for all receiver locations.

Next, a seismic reference datum is selected. This is typically a flat, horizontal datum convenient for mapping the structure. A replacement velocity is chosen which is preferably the refractor velocity. The above process of source and receiver extrapolation is then repeated starting with the data from the simulated sources and receivers at the base of the LVL and extrapolating to the selected reference datum using the replacement velocity. The resulting data simulate the data that would have been recorded had there been no LVL and the sources and receivers had been on the selected reference datum. Preferably, the selected reference datum is located above the highest surface location represented in the seismic data being processed. This avoids the possibility of losing shallow reflection data. Other locations may be used, if desired.

As will be well known to persons skilled in the art, there are a number of methods for estimating the LVL velocity and the depth of the LVL from first arrival refraction data. Any of these methods may be used in connection with the present invention; however, the preferred method is set forth in U.S. Pat. No. 4,695,984 by E. F. Paal. According to this method, three gathers are established, each having traces of a selected offset. The traces of each gather are displayed as a function of common depth point location. From each gather the first break for the traces is determined, the first break representing the transit time for the p-wave travel path from source to receiver along the refraction interface at the bottom of the LVL. For each trace having one of the three selected offsets, an equation is developed relating the known transit time to the sum of three factors: (1) the source-receiver distance divided by the p-wave velocity at the refraction interface; (2) a source contribution to the traveltime; and (3) a receiver contribution to the traveltime. Each of these equations has two unknowns (factors 2 and 3); however, at least one unknown of each equation is shared by two other equations, corresponding to the other offset distances. Thus, the unknowns are over-determined and the equations can be solved through familiar computer implemented least squares simultaneous solution methods.

EXAMPLE

Figure 2:
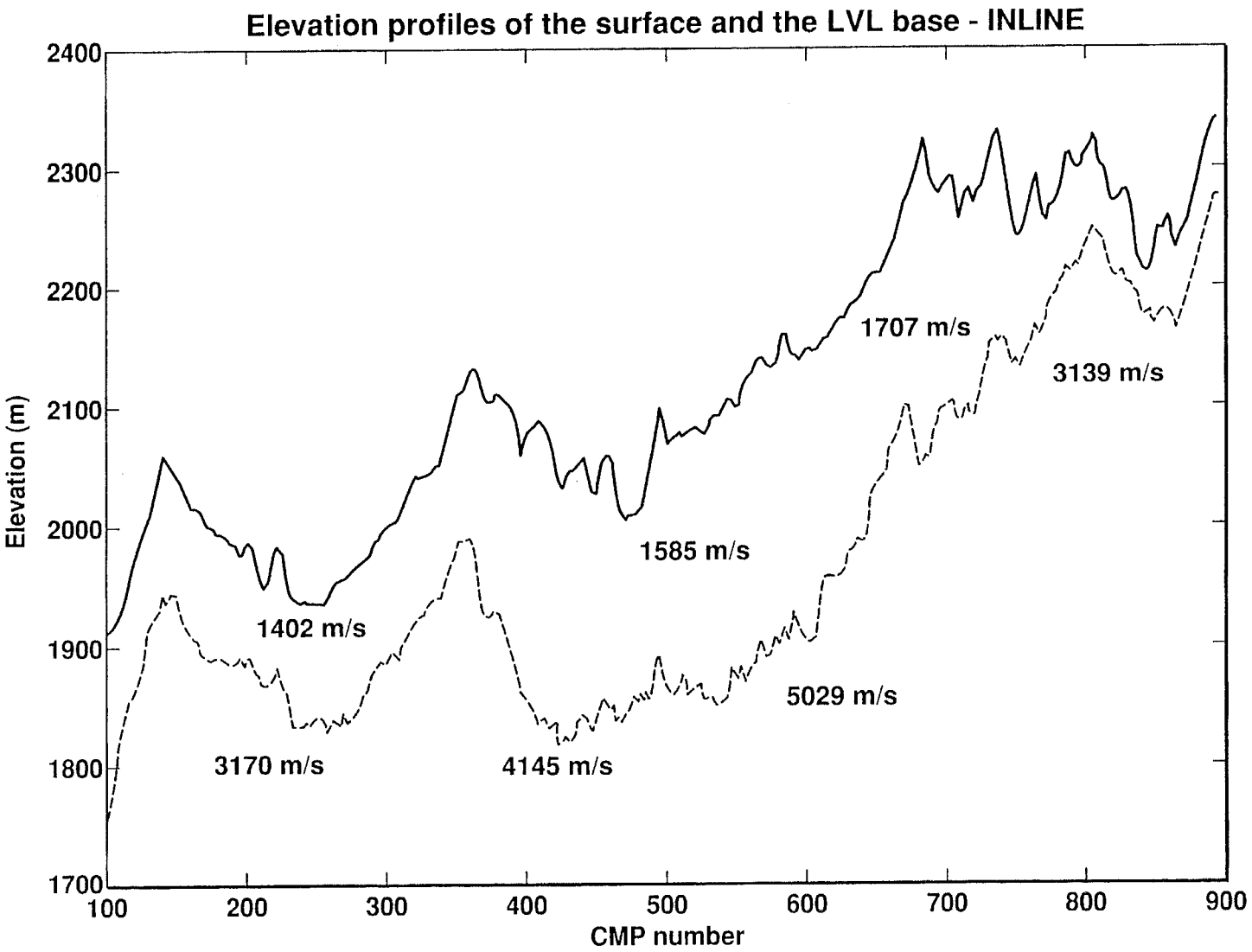
FIG. 2 shows typical near-surface seismic velocities and the elevation profiles of the recording surface and the base of the estimated LVL for line 1 of the Example.
Figure 3:
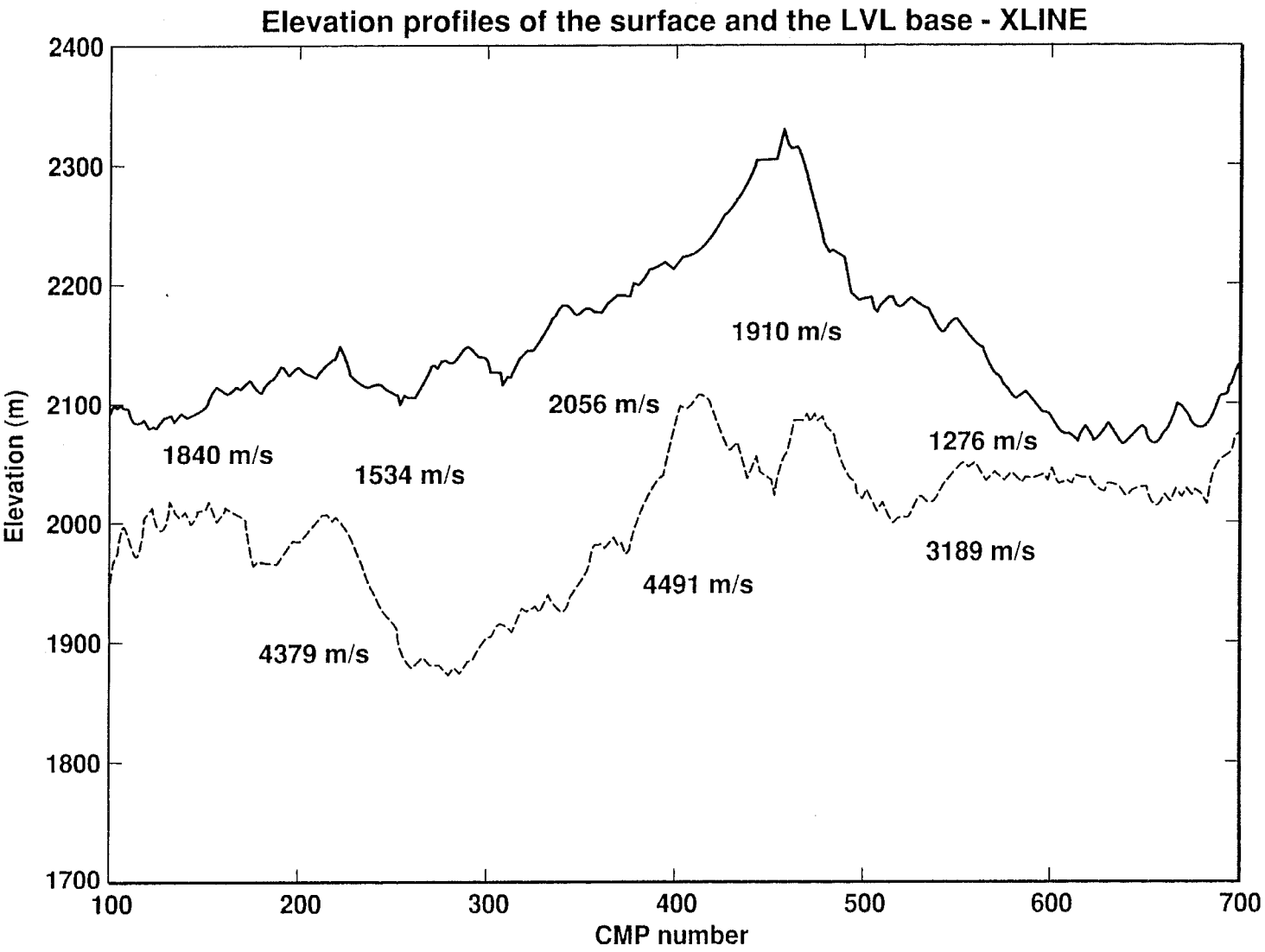
FIG. 3 shows typical near-surface seismic velocities and the elevation profiles of the recording surface and the base of the estimated LVL for line 2 of the Example.
Figure 4:
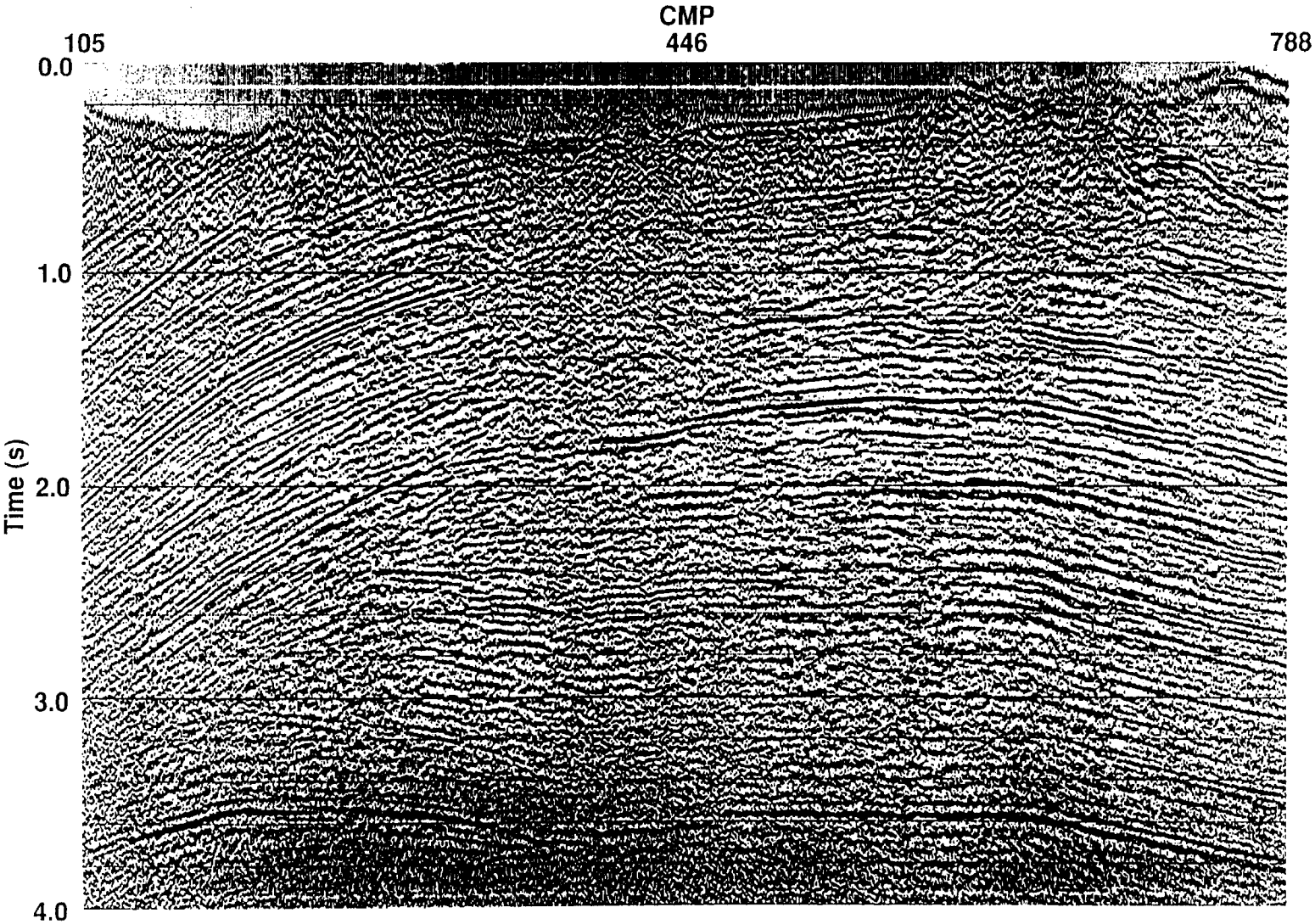
FIG. 4 shows the stacked section for line 1 of the Example using statics for the velocity replacement step.
Figure 5:
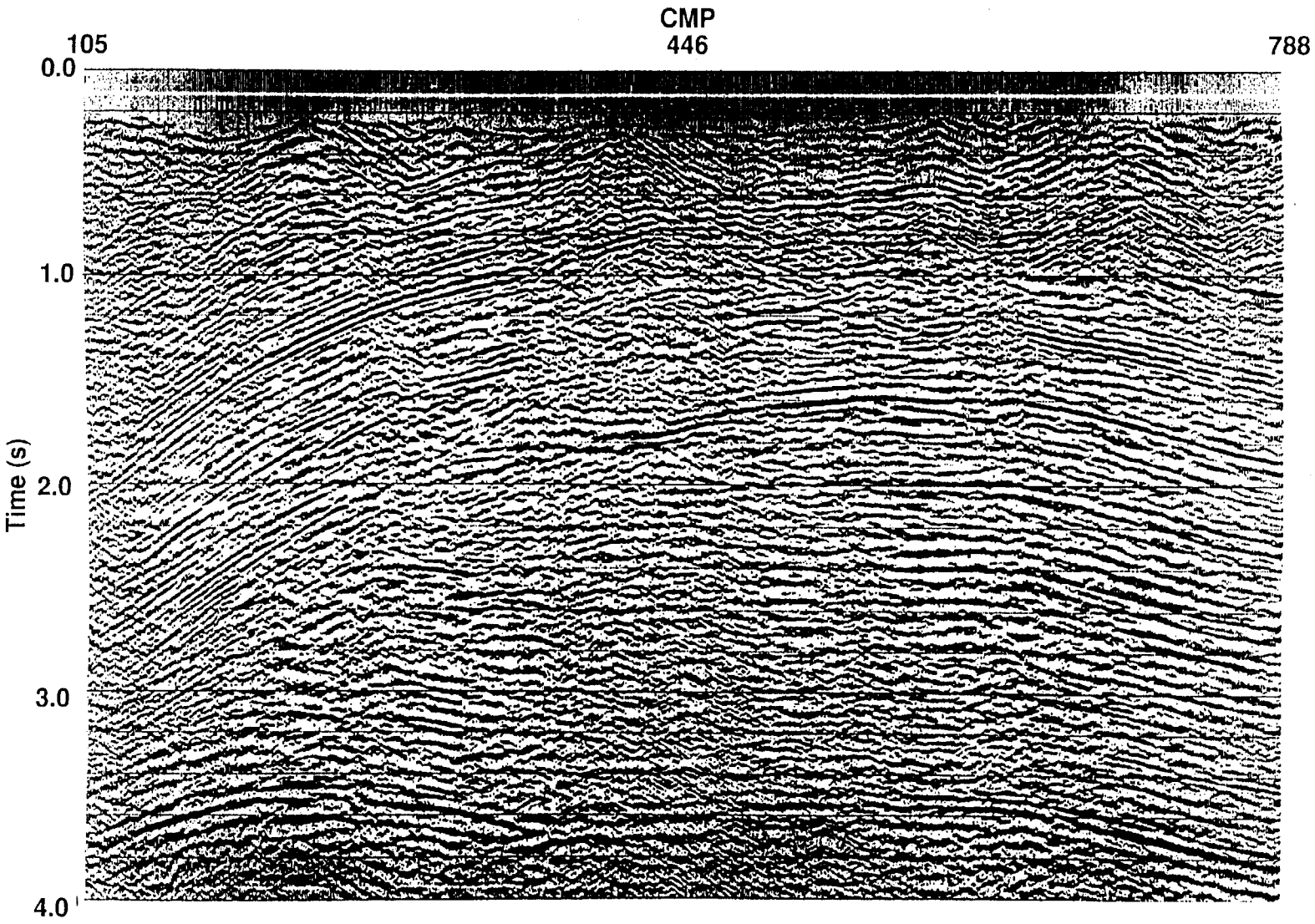
FIG. 5 shows the stacked section for line 1 of the Example using wave equation datuming for the velocity replacement step.
Figure 6:
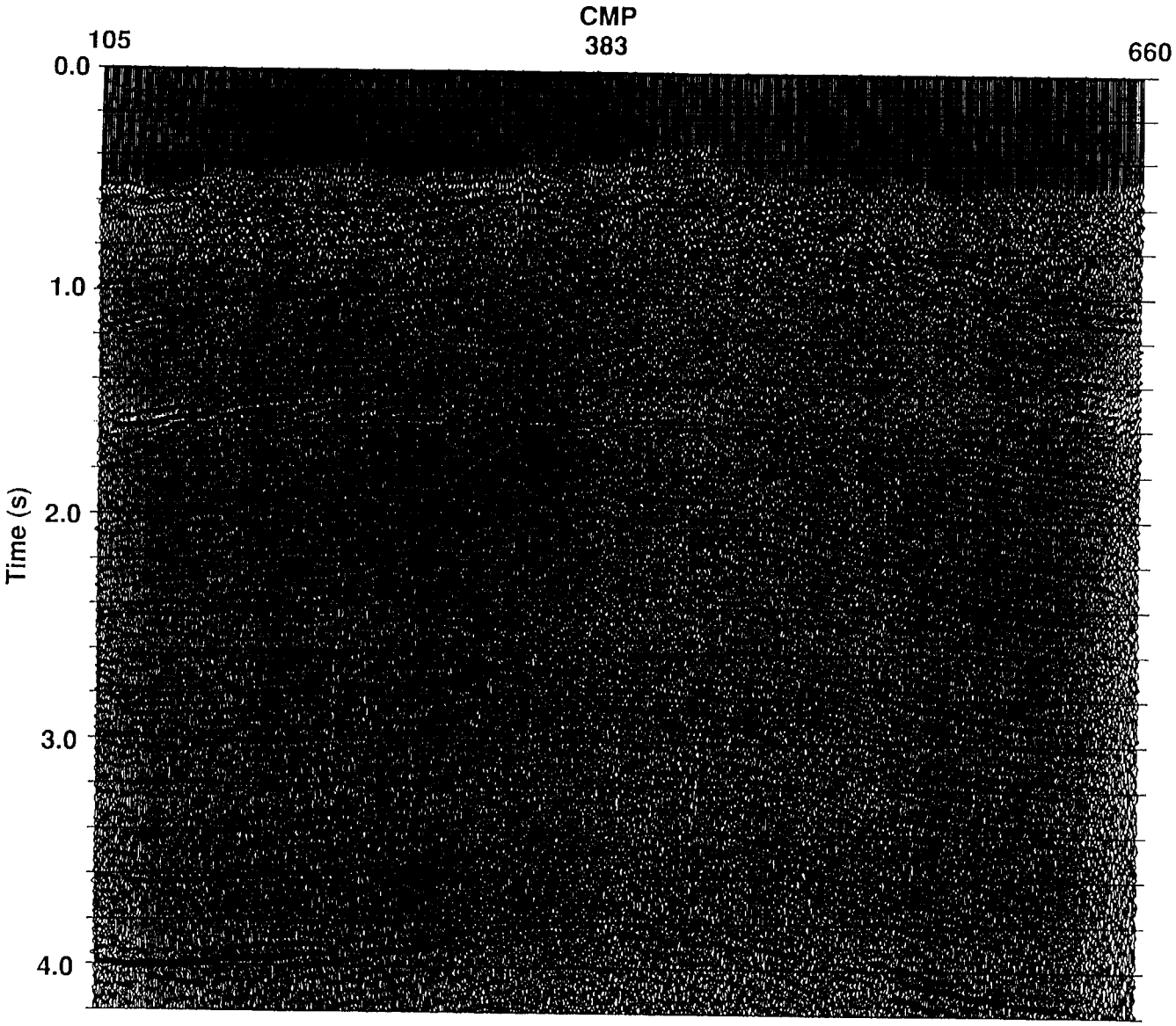
FIG. 6 shows the stacked section for line 2 of the Example using statics for the velocity replacement step.
Figure 7:
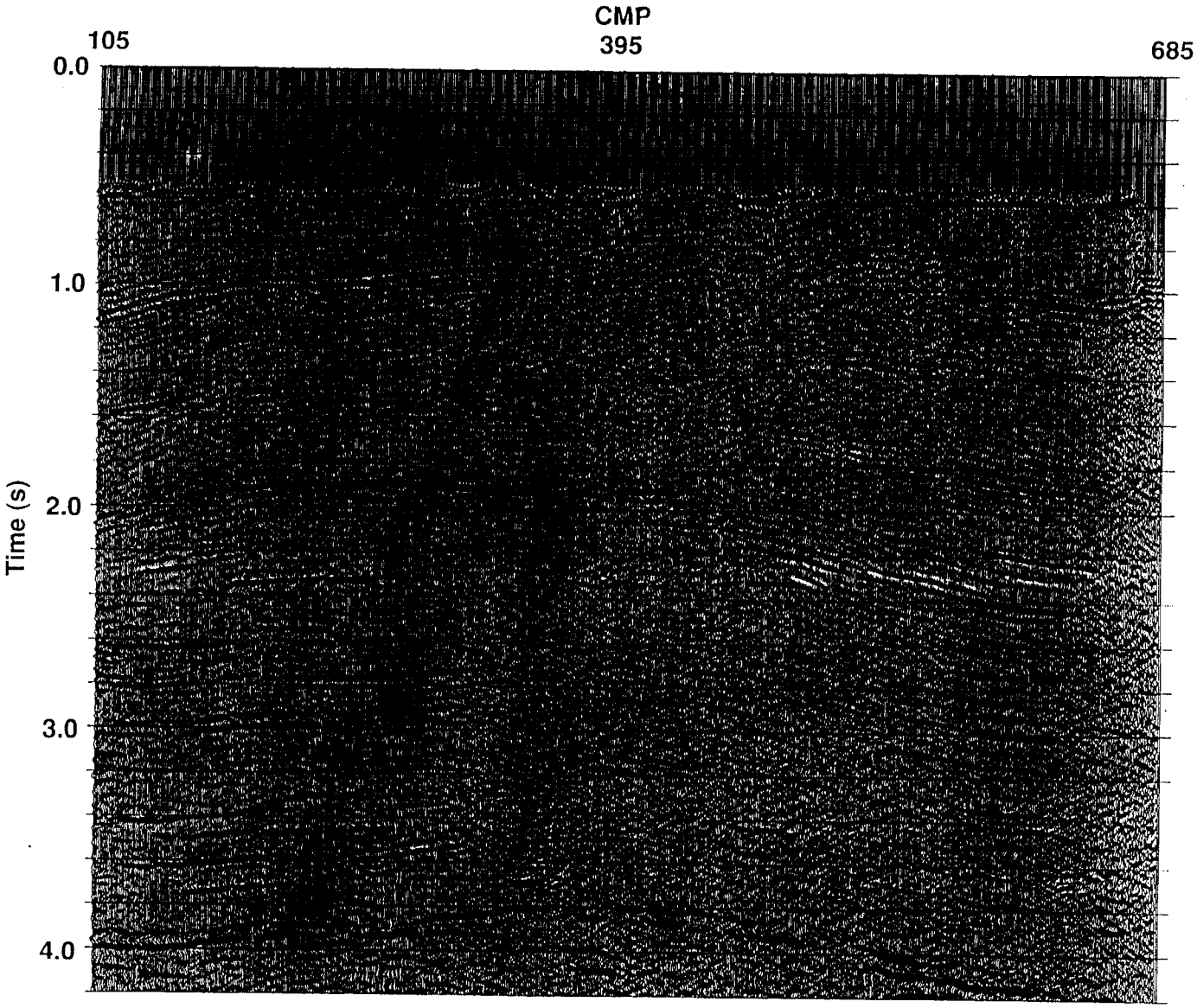
FIG. 7 shows the stacked section for line 2 of the Example using wave equation datuming for the velocity replacement step.

A pair of land seismic lines from one of the western United States overthrust belts was chosen to test the present invention. These data were deemed appropriate for wave equation datuming because of good acquisition qualities (shot interval=receiver interval=50 meters, 96 channel split-spread recording, and no large acquisition gaps). Using only first-arrival refraction information and available geologic knowledge, LVL estimates were obtained using the refraction analysis of Paal set forth in U.S. Pat. No. 4,695,984. Accordingly, the LVL models were probably not exact. FIG. 2 shows estimated near-surface velocities and the elevation profiles of the recording surface and the base of the LVL for line 1, which is a dip line. FIG. 3 shows the corresponding plot for line 2, a strike line. The figures illustrate the considerable topography and nearsurface velocity variations that are present. A processing stream consisting of LVL velocity replacement, velocity analysis, NMO, DMO, residual velocity analysis, and stack was carried out, in a manner familiar to those of ordinary skill in the art of seismic data processing. This processing flow was performed twice on each line, once using conventional elevation and refraction static time shifts and once using wave equation datuming to perform the velocity replacement step. Prior to the first velocity analysis step, the data were tied to a floating-type datum plane for the statics processing stream, a common practice in rough topography areas, while the data were referenced to a horizontal datum by wave equation datuming for the other processing stream. FIG. 4 shows the stacked section for line 1 obtained using static time shifts, and FIG. 5 shows the stacked section for line 1 obtained using wave equation datumingo Similarly, FIGS. 6 and 7 show the stacked sections for line 2 using statics and wave equation datuming, respectively. A shallow dipping thrust-sheet reflection traverses from approximately 2.0 seconds on the left side to 0.5 seconds on the right side of FIGS. 4 and 5, the dip line, while the event remains near 1.0 second all the way across FIGS. 6 and 7, the strike line. Note the superior imaging of the shallow reflection that was obtained through wave equation velocity replacement on both lines: the left center of FIG. 5 at 0.8 second and the entire event near 1.0 second in FIG. 7. The LVL model was not entirely correct, as indicated by the broken shallow reflections seen near the upper right-hand side of FIG. 5, from 0.4–1.0 second, and near the center of FIG. 7, around 0.8 second. As would be recognized by one of reasonable skill in the art, iterating the LVL estimation/wave equation velocity replacement procedure could improve upon these results.

Comparison of the deeper data (below 2.0 seconds) in FIGS. 4 and 5 reveals that the wave equation processed result is noisier than the statics processed result. Wave equation extrapolation and migration are always dip-limited in the sense that their finite apertures impose limits on the actual propagation angles that are extrapolated or imaged. Propagation angles become small in the deeper part of the data. Random noise contains all dips, regardless of where the noise appears in the data; hence, wave equation processing inherently dip filters this noise. The random noise in the deeper part of the data are most severely dip filtered, leaving the low-dip, laterally-coherent components behind. See Yilmaz, *Seismic Data Processing,* Society of Exploration Geophysicists (1987), at p. 324.

Also, the prestack data were gained before processing, which accentuated the problem because it boosted the amplitude of the noise in the deeper parts of the data. A fairer noise comparison would have been made if both processing streams had involved prestack migration instead of CMP stacking. That way both results would have had prestack wave equation processes applied. Such comparisons have been made on other data sets with the result that wave equation datuming results are not noisier than results obtained with refraction statics.

As described above, wave equation velocity replacement has primarily been a tool used on marine seismic data, largely because land seismic data present greater difficulties to prestack wave equation methods and because LVL estimation is considerably more difficult for land data. Refraction statics have long been the standard and crucial method of performing LVL velocity replacement for land data, and in many cases statics have yielded an acceptable result. However, most data processors can recall numerous cases where refraction statics have produced less-than-favorable results. In many situations, these failures occur in complex geological settings where assumptions that would validate statics are severely violated. Wave equation datuming can be successfully applied to appropriate land data in these situations, to perform the LVL velocity replacement. Before the LVL can be replaced, it must be estimated, which is a difficult problem for land data. However, in the above-described Example, standard refraction analysis procedures were employed, with reasonable success. This was just one means of estimating the LVL model. Other means will be well known to those skilled in the art. In the Example, wave equation velocity replacement yielded superior shallow-reflector imaging than was obtainable through refraction statics. Ever-increasing computer power and modern vintage, high-quality field data have made land data more accessible to advanced processing technology such as this.

The best known mode of practicing the present invention has been described above. However, it is to be understood that this description is illustrative only and that other means and techniques can be employed without departing from the scope of the invention, as set forth in the appended claims.

What is claimed is:

1. A method for correcting seismic data for the effects of the low-velocity-layer, comprising the steps of:

a) obtaining estimates of the seismic velocity in the low-velocity-layer and the depth of the low-velocity-layer;

b) using said estimates and the principles of wave equation datuming to extrapolate said seismic data to simulated source and receiver positions located at the base of the low-velocity-layer;

c) selecting a replacement seismic velocity for said low-velocity-layer; and d) using said replacement seismic velocity and the principles of wave equation datuming to extrapolate said seismic data from said simulated source and receiver positions to a selected reference datum.

2. The method of claim 1, wherein said estimates of the seismic velocity in the low-velocity-layer and the depth of the low-velocity-layer are obtained by a first-arrival refraction analysis of said seismic data.

3. The method of claim 1, wherein said replacement velocity is the seismic velocity in the subsurface formation immediately below the low-velocity-layer.

4. The method of claim 1, wherein said selected reference datum is a horizontal datum plane.

5. The method of claim 4, wherein said horizontal datum plane is located above the highest surface location represented in said seismic data.

6. The method of claim 1, wherein said estimates of the seismic velocity in the low-velocity-layer and the depth of the low-velocity-layer are obtained by a) selecting at least three gathers of seismic traces from said seismic data, the traces within each of said gathers having a selected offset;

b) determining for each trace within said seismic trace gathers the first break traveltime, said first break traveltime representing the transit time from source to receiver along the refraction interface at the bottom of the low-velocity-layer;

c) developing for each trace gather an equation relating the known transit time to the sum of (i) the source-receiver distance divided by the seismic velocity at the refraction interface, (ii) a source contribution, and (iii) a receiver contribution; and d) solving said equations using least squares simultaneous solution methods.

7. A method for correcting seismic data for the effects of the low-velocity-layer, comprising:

a) performing a first-arrival refraction analysis of said seismic data to obtain estimates of the seismic velocity in the low-velocity-layer and the depth of the low-velocity-layer;

b) using said estimates and the principles of wave equation datuming to extrapolate said seismic data to simulated source and receiver positions located at the base of the low-velocity-layer;

c) selecting a replacement seismic velocity for said low-velocity-layer; and d) using said replacement seismic velocity and the principles of wave equation datuming to extrapolate said seismic data from said simulated source and receiver positions to a selected reference datum.

8. The method of claim 7, wherein said replacement velocity is the seismic velocity in the subsurface formation immediately below the low-velocity-layer.

9. The method of claim 7, wherein said selected reference datum is a horizontal datum plane.

10. The method of claim 9, wherein said horizontal datum plane is located above the highest surface location represented in said seismic data.

11. The method of claim 7, wherein said first-arrival refraction analysis further comprises the steps of:

a) selecting at least three gathers of seismic traces from said seismic data, the traces within each of said gathers having a selected offset;

b) determining for each trace within said seismic trace gathers the first break traveltime, said first break traveltime representing the transit time from source to receiver along the refraction interface at the bottom of the low-velocity-layer;

c) developing for each trace gather an equation relating the known transit time to the sum of (i) the source-receiver distance divided by the seismic velocity at the refraction interface, ( ii ) a source contribution, and (iii) a receiver contribution; and d) solving said equations using least squares simultaneous solution methods.

* * * * *